United States Patent
Granese et al.

[11] Patent Number: 6,077,012
[45] Date of Patent: Jun. 20, 2000

[54] SELF-RETAINING FASTENER

[75] Inventors: Thomas A. Granese; John P. van den Berg, both of Bothell, Wash.

[73] Assignee: Huck International Inc., Tucson, Ark.

[21] Appl. No.: 09/203,526

[22] Filed: Dec. 1, 1998

[51] Int. Cl.[7] .............................. F16B 19/00; F16B 33/00
[52] U.S. Cl. .......................... 411/361; 411/70; 411/509; 411/970; 411/999
[58] Field of Search ............................. 411/70, 360, 361, 411/392, 508, 509, 510, 970, 999

[56] References Cited

U.S. PATENT DOCUMENTS

| | | |
|---|---|---|
| 3,122,050 | 2/1964 | Wenson .................... 411/361 |
| 3,136,203 | 6/1964 | Davis . |
| 3,638,980 | 2/1972 | Kleinhenn . |
| 3,770,036 | 11/1973 | Sherman . |
| 3,777,358 | 12/1973 | Matievich et al. . |
| 3,812,756 | 5/1974 | Wenger . |
| 3,863,421 | 2/1975 | Busch et al. . |
| 4,012,828 | 3/1977 | Dahl . |
| 4,164,807 | 8/1979 | King, Jr. . |
| 4,472,096 | 9/1984 | Ruhl et al. . |
| 4,813,834 | 3/1989 | Smith . |
| 4,836,728 | 6/1989 | Mauer et al. ............. 411/70 X |
| 4,900,210 | 2/1990 | Buchanan et al. ......... 411/392 X |
| 4,995,777 | 2/1991 | Warmington ............. 411/361 |
| 5,061,137 | 10/1991 | Gourd ..................... 411/392 X |
| 5,064,324 | 11/1991 | Ragaller . |
| 5,154,559 | 10/1992 | Wagner . |
| 5,219,252 | 6/1993 | Schruff . |
| 5,395,194 | 3/1995 | Johnson et al. . |
| 5,685,663 | 11/1997 | Sadri . |
| 5,775,861 | 7/1998 | Leon et al. . |

FOREIGN PATENT DOCUMENTS 8700891  2/1987  WIPO .................... 411/361

*Primary Examiner*—Neill Wilson
*Attorney, Agent, or Firm*—Pillsbury Madison & Sutro LLP

[57] ABSTRACT

A pin for a two piece type fastener includes a flexible member attached to a free end of the pin. The flexible member has a diameter slightly larger than a bore in a workpiece through which it is inserted so that the pin is retained in the bore after insertion. The flexible member also cleans debris from the bore as the pin is installed in the bore, thereby reducing the possibility of the debris from fouling the grooves in the pin.

24 Claims, 2 Drawing Sheets

SELF-RETAINING FASTENER

FIELD OF THE INVENTION

The present invention relates to two piece fasteners and more particularly, to fasteners having a pin or bolt member and a collar or nut member.

DESCRIPTION OF THE PRIOR ART

Two piece fastening systems are quite numerous and include, for example, standard nut and bolt systems and pin and swaged collar systems. One such type of pin and swaged collar fastening system is disclosed in U.S. Pat. No. 4,472,096 to John Ruhl and Richard Dixon, issued Sep. 18, 1984, and assigned to the same assignee as the present invention and which is incorporated by reference herein. Ruhl discloses a headed pin member having a series of centrally located locking grooves on a shank of the pin and a series of pulling grooves on the shank at a free or tail end of the pin. The pin is adapted to pass through a bore in the pieces to be fastened together with the head on one side of the pieces and the locking grooves on the other side of the pieces. A tubular collar can then be positioned over the locking grooves and a swaging tool used to grip the pulling grooves to swage the collar over the locking grooves to fasten the assembly together. The pintail is then adapted to break off from the remainder of the fastened assembly for disposal or recycling.

Such fasteners are often used in applications where an individual cannot easily reach or effectively manipulate both sides of the pin at the same time to hold the pin in place while the collar and swaging tool are placed over the pin. Such an application would include the installation of a large surface skin to a supporting frame of a vehicle or airplane. In such applications, it is common for one individual to install a number of the pins through bores in the skin and framework and for another individual on the other side of the skin and framework to install the collars over the pins and swage the collars onto the pins. Alternatively, one individual may install the pins from one side and move to the other side to install the collars over the pins. Unfortunately, the vibration and pintail separation impact load from the installation tool and installation process will often cause other pins that have not had collars yet swaged on to back out of the bores and fall to the ground. This results in wasted time and effort in reinstalling the pins in the bores. Nor is it efficient to have one individual inserting a pin through the bore and holding it in place while another individual simultaneously installs the collar over the pin.

Kleinhenn, U.S. Pat. No. 3,638,980, issued Feb. 1, 1972, Sherman, U.S. Pat. No. 3,770,036, issued Nov. 6, 1973 and Wenger, U.S. Pat. No. 3,812,756, issued May 28, 1974, all disclose fastening systems utilizing a flexible, ring-like element installed over the shank of a fastening pin to retain the pin in a bore after installation of the pin in the bore. However, both Kleinhenn and Sherman position the rings behind the threaded portions of their respective pins so that debris in the bores (such as dirt, shavings, excess sealant, etc.) can foul the threads upon installation. They also both provide additional grooves in their respective pins for positioning and retaining the rings. These grooves require additional machining and can reduce the overall strength of the pin. Wenger discloses an embodiment in FIGS. 5–7 where the ring is a split ring positioned in a groove machined in the pin but forward of the threads. However, because of the split ring, the bore will not be cleared of all debris during installation of the pin and the ring is free to vibrate and move within the groove after installation. Further, additional length of the pin is needed to accommodate the groove, which can be expensive, especially when the pin is made of titanium or other relatively expensive material. In all three references, the ring is normally retained with the fastener after installation is completed. In certain applications, the ring will be exposed to fuels and solvents after installation and can degrade or dissolve if made of a flexible polymer, thereby contaminating the fuel or solvent and clogging fuel lines and filters.

Busch et al., U.S. Pat. No. 3,863,421, issued Feb. 4, 1975, discloses a fastener utilizing a split ring positioned in a groove in a pin for retaining the pin. Again, the groove requires additional machining and reduces the strength of the pin. Further, since the threads are internal, the pin does not prevent debris in the bore from getting to the threads. Wagner, U.S. Pat. No. 5,154,559, issued Oct. 13, 1992, and Ragaller, U.S. Pat. No. 5,064,324, issued Nov. 12, 1991, both disclose the use of protrusions on or behind the threads for retaining the threaded pins in the workpieces. Neither prevents debris in the bores from fouling the threads.

Smith, U.S. Pat. No. 4,813,834, issued Mar. 21, 1989, and assigned to the same assignee as the present invention, is incorporated by reference herein, and discloses the use of a tab on the locking collar for retaining the collar on the pin. Such types of self-retaining tabbed collars are in current use in industry. However, the tabs will occasionally fall off the collars, thereby eliminating the self-retaining feature, jamming or clogging the installation tool or becoming debris in the fastened structure. Nor do such tabbed collars provide any cleaning of debris from the pin bores.

SUMMARY OF THE INVENTION

The present invention provides a pin for a two piece swage-type fastener that includes a flexible member attached to a free end of the pin. The flexible member has a diameter slightly larger than a bore in the workpiece through which it is inserted so that the pin is retained in the bore after insertion. The flexible member also cleans debris from the bore as the pin is installed in the bore, thereby preventing the debris from fouling the locking or pulling grooves of the pin. The flexible member is either adhesively attached to the pin or adheres to the pin itself and does not require an additional groove in the pin for positioning. Further, as the flexible member is attached to the pintail, it is removed with the pintail upon completion of the swaging of the collar onto the pin and therefore, will not degrade or dissolve and contaminate the fuel or solvent with which it comes into contact. Since the flexible member is at the very end of the pin, it is not intended to be actually gripped by the gripping jaws of the installation tool but to pass beyond the gripping jaws when the installation tool is installed over the pin. Therefore, the flexible member will not clog or foul the gripping jaws of the installation tool.

It is an object of the present invention to provide a pin for use in a two piece fastener that positively retains a collar placed over the pin from falling off of the pin when exposed to gravitational forces, vibration, etc., prior to fastening of the collar to the pin, thereby allowing several collars to be placed over their respective pins prior to fastening the collars to the pins without fear of the collars falling off of the pins.

It is also an object of the present invention to provide a mechanism for positively retaining a pin in a bore, thereby preventing the pin from falling out of the bore when exposed to gravitational forces, vibration, etc., prior to fastening the pin in the bore.

It is also an object of the present invention to provide a self-retaining pin by adding a flexible member to the pin that does not require modification to the underlying pin, a collar to be used with the pin or a workpiece to be clamped.

It is also an object of the present invention to provide a self-retaining pin for use in a two piece swaged fastener that prevents debris in a bore into which the pin is installed or the self-retaining element itself from contaminating locking or pulling grooves in the pin or gripping jaws in an installation tool and resulting in improper fastening of a collar to the pin or slippage of the installation tool from the pin.

It is also an object of the present invention to provide a mechanism for retaining a pin in a bore and cleaning debris from the bore without reducing the strength of the pin and which mechanism is automatically removed from the pin upon completion of the fastening procedure.

The foregoing and other objects, features, characteristics and advantages of the present invention, as well as the methods of operation and functions of the related elements of structure, and the combination of parts and economies of manufacture, will be apparent from the following detailed description and the appended claims, taken in connection with the accompanying drawings, all of which form a part of the specification, wherein like reference numerals designate corresponding parts in the various figures.

DETAILED DESCRIPTION OF THE INVENTION

Figure 1:
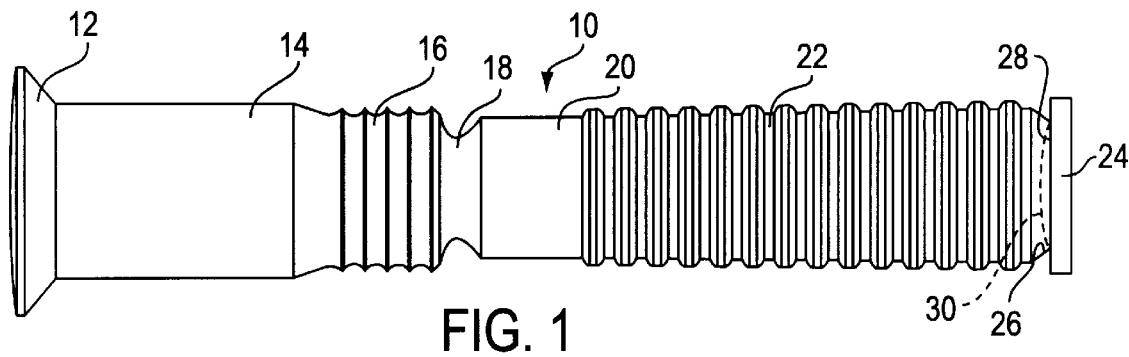
FIG. 1 is a side elevational view of a pin of a swage-type fastener of the present invention.

FIG. 1 shows a swage-type fastener pin 10 of the present invention. The pin 10 includes a head 12 and an elongated shank 14. The shank 14 includes a plurality of locking grooves 16 over which a collar (not shown) can be swaged, as is conventionally known. The shank further includes a breakneck groove 18 and a tail portion or pintail 20. The pintail 20 includes a plurality of pulling grooves 22 adapted to be gripped by a swaging tool, as is conventionally known.

As disclosed in more detail in the Smith '834 patent discussed above, the installation tool includes a set of pulling jaws that are adapted to grip the pulling grooves 22 and a swaging anvil adapted to swage the collar onto the pin 10. In operation, the collar is inserted over the pin and the installation tool is then placed over the pin/collar assembly. Placing the installation tool over the pin causes the gripping/pulling jaws of the tool to engage the pulling grooves of the pin. Activation of the installation tool pushes the swaging anvil into contact with the collar by the pulling action of the pulling jaws, thereby pulling the pin through a bore in a workpiece until it is fully seated, seating the collar against the workpiece and then swaging the collar over the locking grooves 16 until sufficient pulling force is created against the pin 10 by the installation tool to break the pintail 20 away from the pin at the breakneck groove 18.

Figure 4:
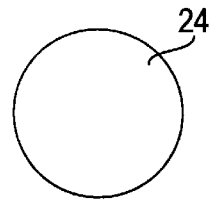
FIG. 4 is an end elevational view of an alternative embodiment of the disc of the present invention.
Figure 7:
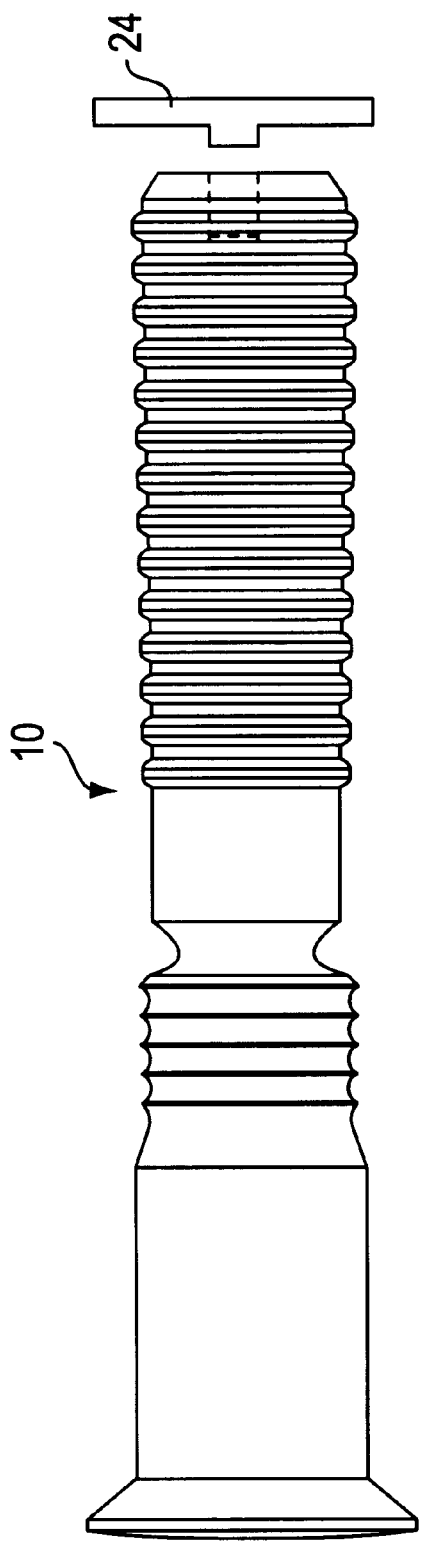
FIG. 7 is a side elevational view of an alternative swage-type fastener pin of the present invention.
Figure 8:
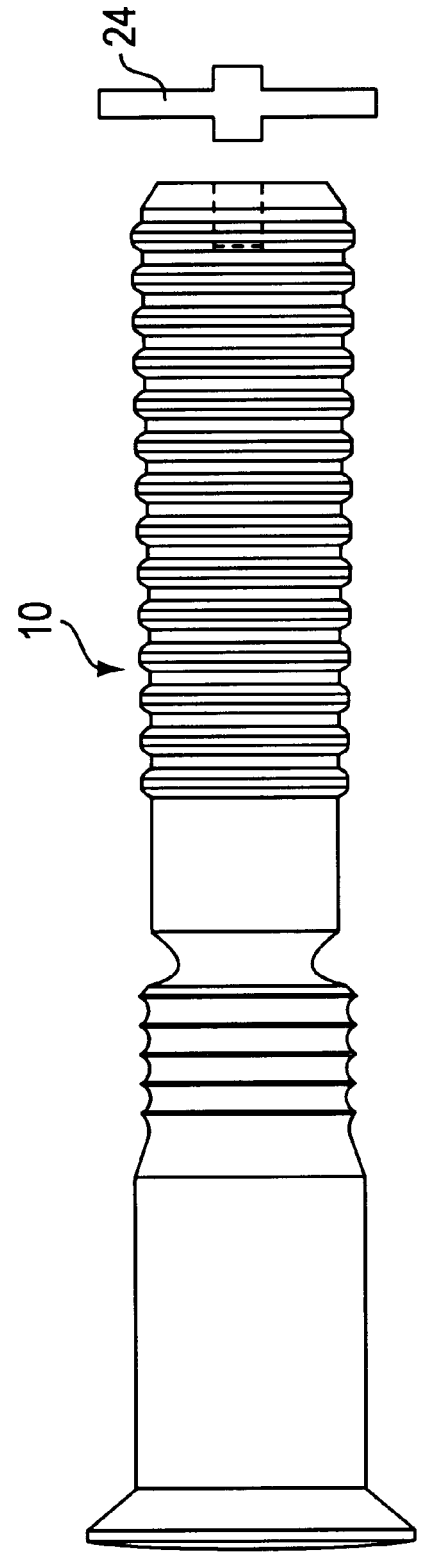
FIG. 8 is a side elevational view of an alternative swage-type fastener pin of the present invention.

A retaining disc 24 is generally centered with respect to and attached to a free end 26 of the pintail 20. In the presently preferred embodiment, the disc 24 is round (see FIG. 4), made of a thin, flexible plastic such as polycarbonate or recycled LD polyethylene and is adhesively attached to a face 28 of the free end 26 of the pintail 20 with Loctite Black Max® 38050 adhesive. A depression 30 (shown in phantom in FIG. 1) can be provided in the face 28 for holding the adhesive. The outer diameter of the disc is sized to be slightly larger than an inner diameter of both a bore in the workpiece through which the pin 10 is inserted and an inner diameter of the collar to be swaged onto the pin. The flexibility of the disc 24 allows the disc to pass through both the bore and the collar even though the disc has a larger diameter than both. The disc can also be provided with a tab or nipple on one side (see FIG. 7) or both sides (see FIG. 8) to engage a retaining bore in the face 28. Additionally, adhesive can also be used with the configurations in FIGS. 7 and 8 to retain the disc on the pin.

The larger diameter disc 24 accomplishes three functions. First, it clears debris from the bore as it is pushed through the bore upon installation of the pin in the bore. This prevents the debris from fouling the locking grooves 16 and the pulling grooves 22, resulting in improper fastening of the collar to the pin or slippage of an installation tool from the pin. Second, once the disc 24 is passed through the bore, it will return to its normal diameter and prevent the pin from falling out of the bore. Finally, since the disc 24 is also larger than the inner diameter of the collar, it will retain the collar on the pin 10 once the collar has been inserted on the pin 10. The disc 24 is designed to have enough flexibility so as to be readily installable through the bore and collar without excess force, yet stiff enough to retain the pin in the bore and the collar on the pin under normal conditions. If necessary, the collar can be removed from the pin and the pin from the bore by the application of additional force. This type of retaining disc 24 can be utilized with a standard pin and does not require additional machining or modification of the pin, collar or clamped workpiece to function. By being placed at the very end of the pin, the disc does not interfere with the gripping of the swaging tool teeth onto the pulling grooves.

Alternatively, an o-ring of a flexible polymeric material can be attached to the free end 26 in place of the disc 24. The o-ring can be attached by adhesive alone, positioned in a locating groove provided in the outer surface of free end 26, or a combination of the two. Since the pin 10 is often made of titanium or other relatively expensive material, it is preferred to not have to lengthen the pin 10 to utilize a groove, if possible, so as to not incur additional material costs in manufacturing the pin 10. In yet another alternative embodiment, the disc 24 or o-ring 32 can be replaced by either 1) a "created" o-ring of a bead of flexible polymeric material deposited around the circumference of free end 26 and allowed to dry prior to installation of the pin in the bore, or 2) a cap of flexible material deposited on the face 28 and extending radially outward to the desired diameter and allowed to dry prior to installation.

Figure 5:
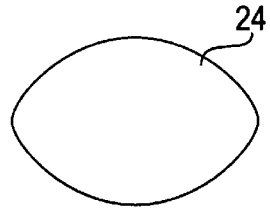
FIG. 5 is an end elevational view of an alternative embodiment of the disc of the present invention.
Figure 6:
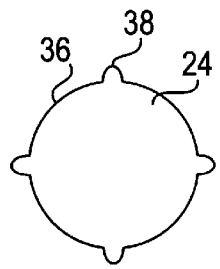
FIG. 6 is an end elevational view of an alternative embodiment of the disc of the present invention.

The disc 24 can also be constructed from other types of materials, including other plastics, flexible polymers, metals and composites. The thickness and/or hardness of the disc 24 can also be varied, depending on the material used, to alter the flexibility of the disc and thus, the amount of force needed to install/remove the pin in/from the bore and the collar on/from the pin. The outer diameter of the disc 24 or ring 32 can also be altered with respect to the inner diameter of the bore or collar to adjust the amount of force needed for installation/removal. Additionally, the disc need not be round but could be annular, oval (see FIG. 5), have extended fingers (see FIG. 6) or be of another shape. In the configuration shown in FIG. 6, the root outer diameter 36 of the disc can be equal to or less than the inner diameter of the bore/collar while only the diameter 38 of the extended fingers exceeds the inner diameter of the bore/collar. In this way, only the extended fingers provide the retaining function while the root diameter can be sized to either provide a debris clearing function, or not. Alternatively, both diameters can be larger than the inner diameters of the bore and collar.

Figure 3:
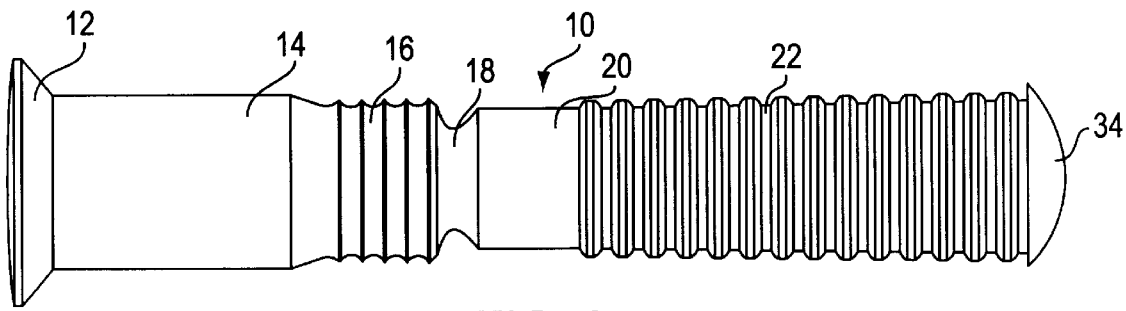
FIG. 3 is a side elevational view of an alternative swage-type fastener pin of the present invention.

The disc also need not be flat but could be at least partially convex with the protrusion facing forward in the direction of the free end of the pin. See FIG. 3. This provides a "streamlined" cross-section in the direction of installation such that the force needed to install the pin/collar is less than the force needed to remove the pin/collar.

The present invention is also applicable to other types of swaged, threaded or alternative fasteners, whether two piece or not.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

We claim:

1. A pin for a fastening system, comprising:
    a head;
    an elongated shank connected to the head, the elongated shank including a free end,
    a flexible member attached to the free end of the shank having a maximum outer diameter greater than an outer diameter of the elongated shank, wherein the flexible member comprises a disc of flexible material.

2. A pin as in claim 1, wherein the flexible member is attached to an end face of the free end being generally perpendicular to a longitudinal axis of the pin.

3. A pin as in claim 1, wherein the disc is constructed of plastic.

4. A pin as in claim 1, wherein the disc has a circular shape.

5. A pin as in claim 1, wherein the disc has a generally circular shape and includes at least one tab extending radially beyond an outer circumference of the generally circular portion of the disc.

6. A pin as in claim 1, wherein the flexible member is adhesively attached to the pin.

7. A pin as in claim 1, wherein the pin is for a swage-type fastening system and the shank includes at least one generally circumferential locking groove over which a collar can be swaged and at least one generally circumferential pulling groove adapted to be gripped by an installation tool.

8. A pin as in claim 7, wherein the pin includes a generally circumferential breakneck groove between the head of the pin and the free end of the shank.

9. A pin as in claim 8, wherein the breakneck groove is positioned between the locking groove and the pulling groove.

10. A pin for a fastening system, comprising:
    a head;
    an elongated shank connected to the head, the elongated shank including a free end,
    a flexible member attached to the free end of the shank having a maximum outer diameter greater than an outer diameter of the elongated shank, wherein the flexible member comprises a ring of a flexible polymeric material.

11. A pin as in claim 10, wherein the flexible member is adapted and arranged to retain the pin in a bore once the pin is inserted into the bore.

12. A pin as in claim 11, wherein the flexible member is adapted and arranged to retain a collar on the pin once the collar is inserted on the pin.

13. A pin as in claim 12, wherein the flexible member is adapted and arranged to clean debris from the bore when the pin is inserted into the bore, thereby preventing the debris from fouling grooves in the pin.

14. A pin as in claim 11, wherein the flexible member is adapted and arranged to clean debris from the bore when the pin is inserted into the bore, thereby preventing the debris from fouling grooves in the pin.

15. A pin as in claim 10, wherein the flexible member has a semi-spherical shape with a convex surface of the flexible member facing in a direction extending away from the free end along a longitudinal axis of the pin.

16. A pin as in claim 10, wherein the ring is an o-ring.

17. A pin as in claim 11, wherein the ring is a bead of flexible polymeric material deposited on the free end of the shank.

18. A pin as in claim 1, wherein the flexible member is adapted and arranged to retain the pin in a bore once the pin is inserted into the bore.

19. A pin as in claim 18, wherein the flexible member is adapted and arranged to retain a collar on the pin once the collar is inserted on the pin.

20. A pin as in claim 18, wherein the flexible member is adapted and arranged to clean debris from the bore when the pin is inserted into the bore, thereby preventing the debris from fouling grooves in the pin.

21. A pin as in claim 19, wherein the flexible member is adapted and arranged to clean debris from the bore when the pin is inserted into the bore, thereby preventing the debris from fouling grooves in the pin.

22. A pin as in claim 1, wherein the flexible member has a semi-spherical shape with a convex surface of the flexible member facing in a direction extending away from the free end along a longitudinal axis of the pin.

23. A swage-type fastening system, comprising:
    a pin comprising:
        a head;
        an elongated shank connected to the head, the elongated shank including at least one generally circumferential locking groove over which a collar can be swaged, at least one generally circumferential pulling groove adapted to be gripped by an installation tool, a free end, and a generally circumferential breakneck groove positioned between the locking groove and the pulling groove a flexible member attached to the free end of the shank having a maximum outer dimension greater than an outer diameter of the elongated shank; and a collar adapted and arranged to be placed over the shank and swaged into the locking groove on the shank, wherein the flexible member is adapted and arranged to retain the pin in a bore once the pin is inserted into the bore and the collar on the pin once the collar is inserted on the pin.

24. A swage-type fastening system as in claim 23, wherein the flexible member is also adapted and arranged to clean debris from the bore when the pin is inserted into the bore, thereby preventing the debris from fouling grooves in the pin.

\* \* \* \* \*

UNITED STATES PATENT AND TRADEMARK OFFICE
CERTIFICATE OF CORRECTION

Figure 2:
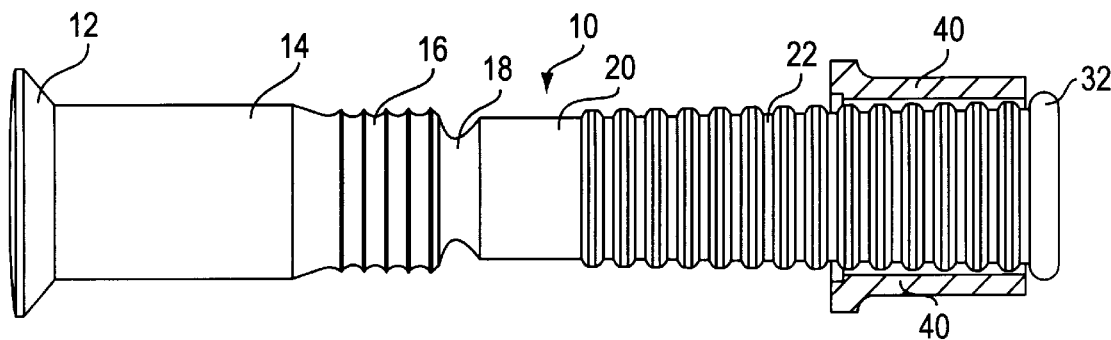
FIG. 2 is a side elevational view of an alternative swage-type fastener pin of the present invention.

PATENT NO. : 6,077,012
DATED : June 20, 2000
INVENTOR(S) : Thomas A. Granese; John P. van den Berg It is certified that error appears in the above-identified patent and that said Letters Patent is hereby corrected as shown below:

Col. 1, line 54, delete "(not shown)" and substitute therefor --40 (shown in section in Fig. 2)--.

Signed and Sealed this

Twenty-second Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,077,012
DATED : June 20, 2000
INVENTOR(S) : Thomas A. Granese; John P. Van de Berg It is certified that error appears in the above-identified patent and that said Letters Patent is hereby corrected as shown below:

Column 3,
Line 54, delete "(not shown)" and substittue therefor
-- 40 (shown in section in Fig. 2) --.

Signed and Sealed this

Ninth Day of October, 2001

Attest:

NICHOLAS P. GODICI
Attesting Officer
Acting Director of the United States Patent and Trademark Office